(12) United States Patent
Ota

(10) Patent No.: US 10,965,452 B2
(45) Date of Patent: Mar. 30, 2021

(54) IMAGE PROCESSING APPARATUS, METHOD, AND SYSTEM

(71) Applicant: CANON KABUSHIKI KAISHA, Tokyo (JP)

(72) Inventor: Shunsuke Ota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 15/989,051

(22) Filed: May 24, 2018

(65) Prior Publication Data

US 2018/0351739 A1  Dec. 6, 2018

(30) Foreign Application Priority Data

May 31, 2017  (JP) .............................. JP2017-108255

(51) Int. Cl.
*H04L 9/08* (2006.01)
*H04L 9/30* (2006.01)
*H04L 9/32* (2006.01)
*G06K 9/00* (2006.01)

(52) U.S. Cl.
CPC ........ *H04L 9/0866* (2013.01); *G06K 9/00087* (2013.01); *G06K 9/00181* (2013.01); *G06K 9/00892* (2013.01); *H04L 9/30* (2013.01); *H04L 9/3213* (2013.01); *H04L 9/3231* (2013.01); *G06K 2009/00932* (2013.01); *G06K 2009/00953* (2013.01)

(58) Field of Classification Search
CPC ....... H04L 9/0866; H04L 9/30; H04L 9/3231; H04L 9/3213; H04L 9/08; H04L 9/32; G06K 9/00181; G06K 9/00892; G06K 9/00087; G06K 2009/00932; G06K 2009/00953; G06K 9/00; G06F 21/32; G06F 21/46

See application file for complete search history.

(56) References Cited

U.S. PATENT DOCUMENTS

| 2015/0200935 A1* | 7/2015 | Ikeda .................. H04L 63/0861 726/7 |
| 2015/0270969 A1* | 9/2015 | Ishizaka ................. H04L 9/321 713/185 |
| 2016/0171354 A1* | 6/2016 | Glasgow ............ G06Q 30/0207 358/1.14 |
| 2017/0337542 A1* | 11/2017 | Kim ..................... G06Q 20/367 |
| 2019/0036917 A1* | 1/2019 | Sun .......................... H04L 29/06 |

FOREIGN PATENT DOCUMENTS

JP  2013-191236 A  9/2013

* cited by examiner

*Primary Examiner* — Kevin Bechtel
*Assistant Examiner* — Quazi Farooqui
(74) *Attorney, Agent, or Firm* — Canon U.S.A., Inc. IP Division

(57) ABSTRACT

An image processing apparatus communicates with a user's portable terminal, where the portable terminal includes an authentication module for biometric authentication. When the image processing apparatus receives verification data issued by a service providing system, the image processing apparatus uses the portable terminal's authentication module for the biometric authentication and requests a device authentication system cooperating with the service providing system to issue an authentication token.

15 Claims, 9 Drawing Sheets

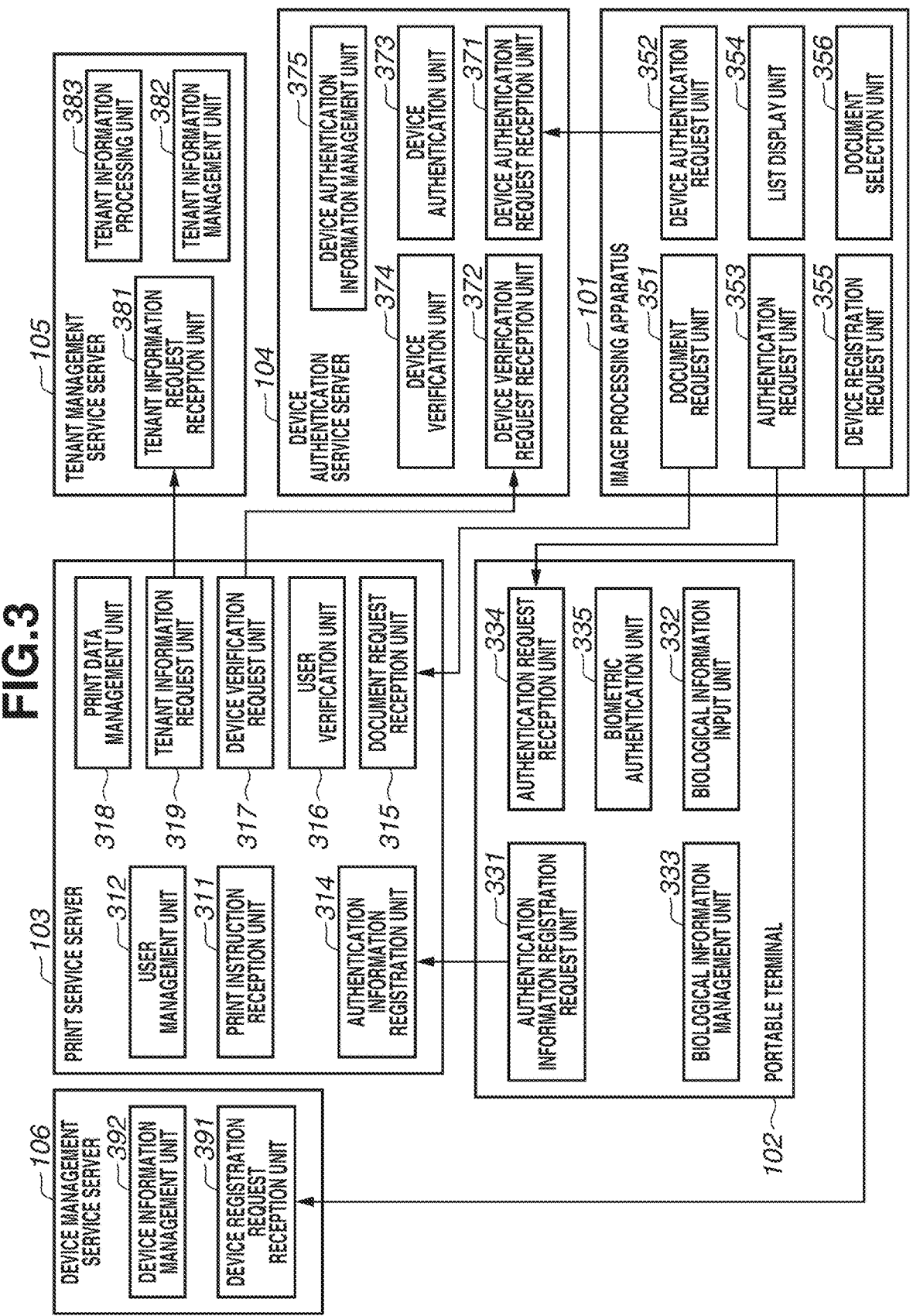

IMAGE PROCESSING APPARATUS, METHOD, AND SYSTEM

BACKGROUND

Field

The present disclosure relates to a method for controlling a device that can be used by a user who is biometrically authenticated when an image processing apparatus is used.

Description of the Related Art

Recently, Fast Identity Online (FIDO) has drawn attention as a new authentication system including biometric authentication.

A user's biological information, such as a fingerprint and a vein, used in the biometric authentication cannot be rewritten, unlike a password in identification (ID) and password authentication, so that if such information becomes public, it can lead to security issues. In FIDO, an authentication process is performed on a terminal that a user has instead of on a server via the Internet. The user's biological information is strictly managed in a secure storage area of the terminal performing the authentication instead of being stored on any network location. Thus, the risk of such information becoming public is reduced.

Conventionally, there are systems in public places and offices providing services to users on devices that use network services after performing authentication to secure security.

For example, Japanese Patent Application Laid-Open No. 2013-191236 describes a system in which an authentication server performs authentication using information read from an integrated circuit (IC) card when a user operates an image processing apparatus. A print job corresponding to a user ID that was successfully authenticated is downloaded from a print server to the image processing apparatus. In addition, Japanese Patent Application Laid-Open No. 2013-191236 describes that the authentication server performs the authentication using biological information, such as a fingerprint and a finger vein, instead of the IC card authentication.

It is desirable for such system to adopt a special mechanism including more secure biometric authentication, such as the above-described FIDO.

SUMMARY OF THE INVENTION

An image processing apparatus including a communication function that communicates with a portable terminal including an authentication module for biometric authentication and a storage region having tamper resistance, the storage region storing biological information of a user necessary for the authentication module to perform authentication processing and a secret key generated when the biological information is registered, the image processing apparatus includes a memory storing instructions, and a processor executing the instructions to cause the image processing apparatus to transmit, in a case where verification data generated for using a service providing system is received via a network, the verification data to the portable terminal, receive signature data generated using the secret key stored in the storage region and the verification data from the portable terminal in response to a success in authentication processing of the user by the authentication module included in the portable terminal, transmit a request for device authentication to a device authentication system, receive an authentication token issued by the device authentication system, and transmit the signature data and the authentication token to a transmission source of the verification data via the network, wherein, in a case where the signature data is verified by a public key corresponding to the secret key, and identification information of the image processing apparatus is obtained by requesting the device authentication system to verify the authentication token, the service providing system provides a service to the image processing apparatus.

Further features will become apparent from the following description of exemplary embodiments with reference to the attached drawings.

BRIEF DESCRIPTION OF THE DRAWINGS

FIG. 3 illustrates an example of function blocks of software according to the present disclosure.

DESCRIPTION OF THE EMBODIMENTS

Various exemplary embodiments will be described below with reference to the attached drawings.

Figure 1:
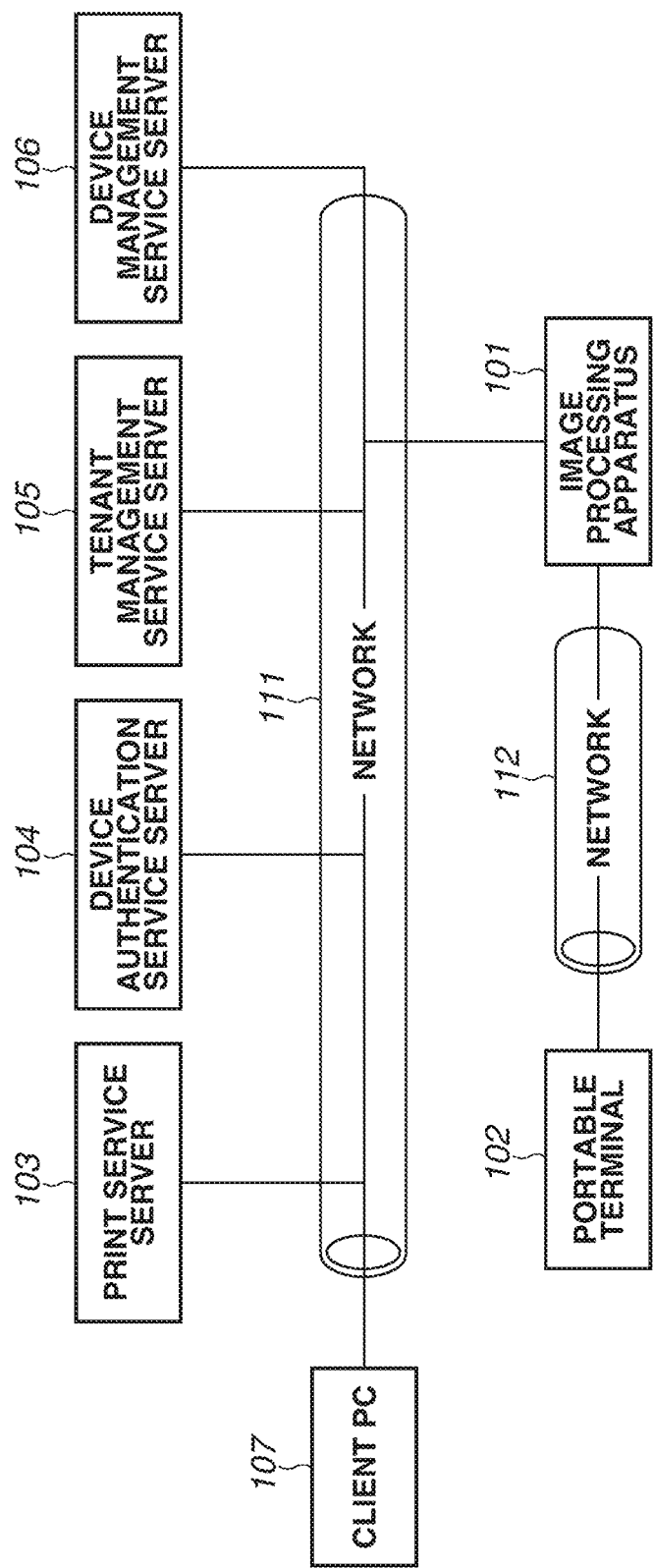
FIG. 1 illustrates an example of a system configuration according to the present disclosure.

FIG. 1 illustrates an example of a system configuration according to the present disclosure.

The present system includes an image processing apparatus 101, a print service server 103, a device authentication service server 104, a tenant management service server 105, and a device management service server 106. The image processing apparatus 101 is connected to a portable terminal 102 via a network 112. A network 111 is a communication network realized by any of, for example, a local area network (LAN) such as the Internet, a wide area network (WAN), a telephone line, a dedicated digital line, an asynchronous transfer mode switching system (ATM), a frame relay line, a cable television line, and a radio channel for data broadcasting or combinations thereof. The network 112 includes near field communication such as Bluetooth® in addition to the above-described network line such as the LAN.

The image processing apparatus 101 can be any device that obtains data from the network and outputs the data as image data and a physical medium, such as a printer, a copy machine, a digital health machine (a blood pressure measuring device, a room runner, etc.), an ATM, and a three-dimensional (3D) printer (for printing (forming) a three-dimensional shaped object). The print service server 103 can alternatively be used in various service providing systems that provide services for supplying data to be an output target to image processing apparatuses. The print service server 103 can comprise an image processing apparatus that accumulates document data pieces of multiusers and provides the data in response to a request from another apparatus.

An example of a system is described in detail below in which print data is provided to the image processing apparatus 101, and the image processing apparatus 101 prints and outputs the print data.

The portable terminal 102 can be a laptop personal computer (PC), a portable terminal (a smartphone and a tablet), or a wearable terminal, such as a smart watch and smart glasses.

The device authentication service server 104 is a server that constructs a device authentication system and is prepared for performing device authentication using an authentication token to uniquely identify the image processing apparatus and the like registered in the device management service server 106. The device authentication service server 104 cooperates with the print service server 103 to ensure the print service server 103 an appropriate image processing apparatus.

The tenant management service server 105 is a server used in a second exemplary embodiment and is described in detail below.

Figure 2A:
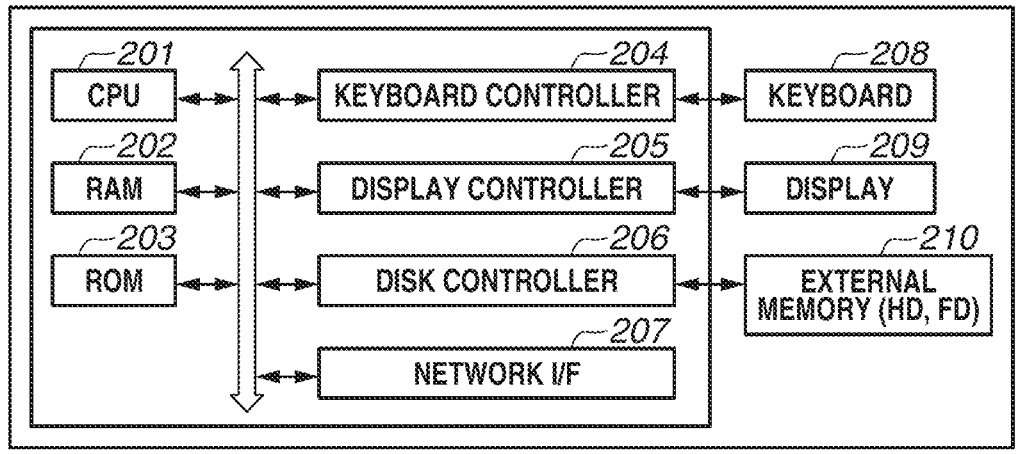
FIGS. 2A to 2C illustrate an example of a hardware configuration of each apparatus according to the present disclosure.
Figure 2B:
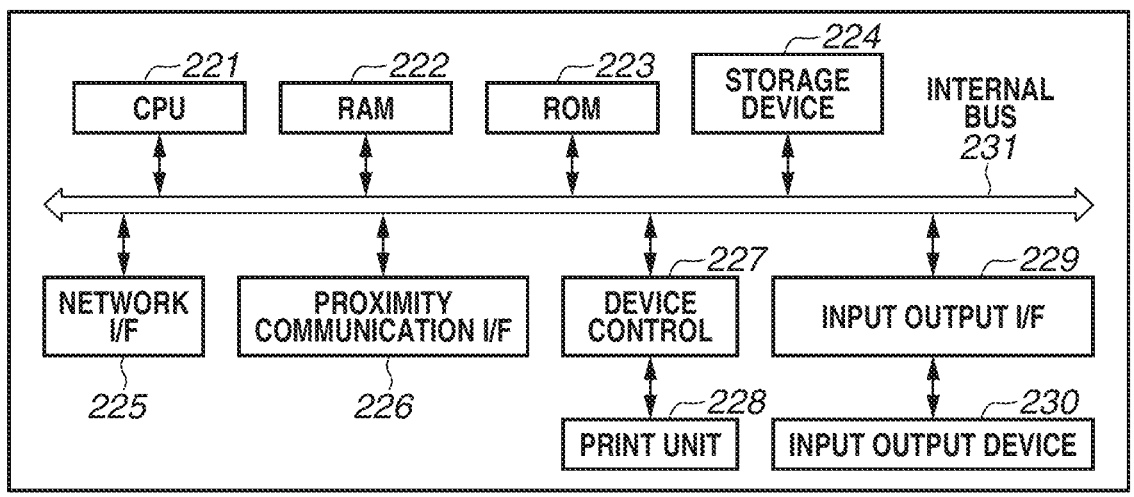
Figure 2C:
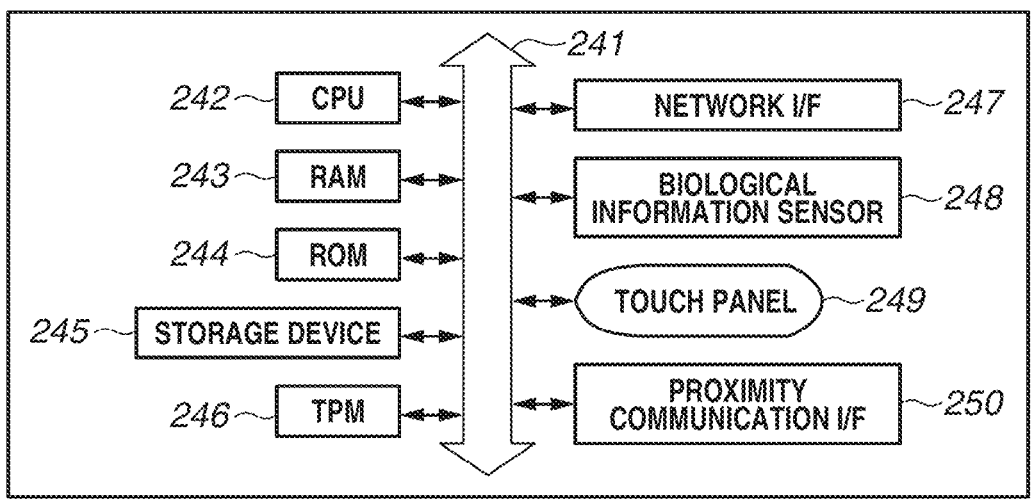

FIGS. 2A to 2C illustrate an example of a hardware configuration of each apparatus of the present disclosure.

FIG. 2A is a hardware configuration diagram of an information processing apparatus that represents the print service server 103, the device authentication service server 104, the tenant management service server 105, and the device management service server 106. These service servers can include hardware similar to that of a general personal computer (PC).

A central processing unit (CPU) 201 executes a program stored in a read only memory (ROM) 203 and a program of an operating system (OS) and an application loaded from an external memory 210 to a random access memory (RAM) 202. In other words, the CPU 201 executes the program stored in the readable storage medium and functions as each processing unit for executing processing in a flowchart described below. The RAM 202 is a main memory of the CPU 201 and functions as a work area and the like. A keyboard controller 204 controls an operation input from a keyboard 208 and a pointing device (such as a mouse, a touch pad, a touch panel, or a trackball) (not illustrated). A display controller 205 controls display on a display 209. A disk controller 206 controls data access to the external memory 210, such as a hard disk (HD) and a flexible disk (FD), for storing various data pieces. A network interface (I/F) 207 is connected to the network and executes communication control processing to another device connected to the network.

The print service server 103, the device authentication service server 104, the tenant management service server 105, and the device management service server 106 store information to be managed by each server described below in storage devices, such as the external memory 210, included in the device itself and/or a storage on the network.

FIG. 2B is a hardware configuration diagram of the image processing apparatus 101 that represents the configuration of a printer.

A CPU 221 includes a program (including a program for realizing each processing described below) stored in a ROM 223 and comprehensively controls each element via an internal bus 231. A RAM 222 functions as a memory and a work area of the CPU 221. A network I/F 225 directionally or bidirectionally exchanges data with an external network device. A proximity communication I/F 226 is a network I/F for proximity communication such as Bluetooth® and includes a configuration for a communication function of communicating with the portable terminal 102 and the like to exchange data. A device control 227 controls a print unit 228. The CPU 221 performs execution processing of the programs together with the RAM 222 and the ROM 223 and performs processing for recording image data to a storage medium such as a storage device 224. The storage device 224 functions as an external storage device. An input output device 230 includes a plurality of configurations for performing input and output in the image processing apparatus 101. More specifically, the input output device 230 receives an input (a button input) from a user and transmits a signal corresponding to the input to each of the above-described units from an input output I/F 229. In addition, the input output device 230 includes a display device (such as a touch panel) for providing necessary information to a user and receiving a user operation. The input output device 230 can display and output (notify) data provided from a service providing apparatus on the network.

The input output device 230 can include a scanning device for reading a document and receiving electronic data as an input. In, for example, a 3D printer, a stage and a head for forming a three-dimensional shaped object are mounted as the print unit 228.

FIG. 2C is a hardware configuration diagram of the portable terminal 102.

A CPU 242 includes a program (including a program for realizing each processing described below) stored in a ROM 244 and comprehensively controls each element via an internal bus 241. A RAM 243 functions as a memory and a work area of the CPU 242. A network I/F 247 directionally or bidirectionally exchanges data with an external network device using Wireless Fidelity (Wi-Fi®) and the like. The CPU 242 performs execution processing of the programs together with the RAM 243 and the ROM 244 and performs processing for recording data to a storage medium such as a storage device 245. The storage device 224 functions as an external storage device, such as a secure digital (SD) card and the like.

A trusted platform module (TPM) 246 is a storage unit including tamper resistance for protecting stored data against external access in order to process and store confidential information. As a specific example of a storage unit including tamper resistance, a storage unit conforming to a TPM 2.0 (or higher versions), which is the industry standard, is assumed. According to the present disclosure, biological information used in biometric authentication or a feature amount of the biological information, a secret key corresponding to the biological information, and the like are stored in the TPM 246. In the description below, a feature amount of a signal indicating biological information obtained by a sensor can be referred to as the biological information in some cases. A biological information sensor 248 is a sensor that reads biological information of a user, for example, a fingerprint, an iris, a vein, a voiceprint, or a face image, and converts the information into a signal. The biological information sensor 248 is realized using a dedicated reading device, a camera, a microphone, and the like.

A touch panel 249 that includes functions of display and input displays an application screen and a keyboard and, when a user applies a pressure on the screen using the user's finger or a dedicated pen, externally outputs information of a touched position on the screen as an information signal. An application uses the output information signal, enabling the user to operate the application via the touch panel 249. The biological information sensor 248 and the touch panel 249 can be mounted by overlapping one another and configured to read fingerprint information of a user by an operation on the touch panel 249.

A proximity communication I/F 250 is an I/F corresponding to a proximity communication system, such as near field communication (NFC) and Bluetooth® similar to that of the image processing apparatus 101, and according to the present exemplary embodiment, communication with the image processing apparatus 101 is performed via the proximity communication I/F 250.

FIG. 3 illustrates configurations of function modules that are realized by software included in each of the apparatuses and the devices according to the present disclosure. These configurations realize three major types of processing, namely "receipt of a print instruction from the client PC 107 to the print service server 103", "registration processing of authentication information from the portable terminal 102 to the print service server 103", and "a print request from the image processing apparatus 101 to the print service server 103". These three types of processing are described below together with a description of each configuration illustrated in FIG. 3.

Each unit in the print service server 103, the device authentication service server 104, and the tenant management service server 105 illustrated in FIG. 3 is stored in the ROM 203 as a program and executed on the RAM 202 by the CPU 201. Each unit in the image processing apparatus 101 is stored in the ROM 223 as a program and executed on the RAM 222 by the CPU 221. Similarly, each unit in the portable terminal 102 is stored in the ROM 244 as a program and executed on the RAM 243 by the CPU 242.

<<Reception of Print Instruction from Client PC 107 to Print Service Server 103>>

First, a user logs into a print service of the print service server 103 using the client PC 107 and the like and selects a print target document as a print instruction to the print service server 103. At this time, the user of the client PC 107 can select and designate the image processing apparatus that can print the selected document from among device data pieces stored in the device management service server 106, which is described below. When the image processing apparatus is not selected and designated, it can be determined that any image processing apparatus can perform printing.

A print instruction reception unit 311 of the print service server 103 receives a print instruction including data of the print target document and device information indicating the image processing apparatus that can perform printing. A print data management unit 318 stores the data pieces included in the print instruction in a format indicated in a Table A shown below. The data of the document includes attribute information such as a document name, a data file, and information indicating a file storage location.

In Table A, a document name is a name of a document selected by a user as a print instruction and is displayed on the image processing apparatus 101 in a print flow described below. Document data is binary data of a document to be printed. User identification information (ID) is an ID for uniquely indicating a user who instructs printing. The user ID is information that can specify the user since the print instruction is issued after the user logs into the print service. A print device ID is device identification information for identifying the device designated when a user instruct printing. When the user does not designate the device in printing, a special flag such as "*" is set as information indicating that any device can perform printing. The print service server 103 can manage a user who can perform printing and a device capable of printing as a service providing destination by

TABLE A

| Document name | Document data | User ID | Print device ID |
|---|---|---|---|
| aaa.doc | 010100101010101010 . . . | user001 | dev001 |
| bbb.ppt | 001010010101001111 . . . | user003 | dev002, dev003 |
| ccc.txt | 011111010110111 0111 . . . | user004 | * |
| . | . | . | . |
| . | . | . | . |
| . | . | . | . |

A user who uses the client PC 107 generates a user account for using the print service in advance with respect to the print service server 103 in a general method such as an ID and a password. In addition, when instructing printing, the user logs into the print service using the user ID and the password as the user account and performs the print instruction. According to the present exemplary embodiment, a combination of an ID and a password generated in advance is referred to as a legacy credential. The legacy credential is stored in a storage device and managed by a user management unit 312.

A device registration request reception unit 391 of the device management service server 106 receives a device registration request from a device registration request unit 355 of the image processing apparatus 101. The device information included in the device registration request is managed by a device information management unit 392 on a storage device. The information to be managed is information, such as a device ID, a product name, and an installed location thereof, from which a device that can print can be determined when a user instructs printing.

The print service server 103 can enable a user of the client PC 107 to designate the image processing apparatus to perform printing when document data to be printed later is registered from the client PC 107. Thus, the print service server 103 displays a device list to the client PC 107. Therefore, the print service server 103 requests the device information from the device information management unit 392 of the device management service server 106. The print service server 103 provides the device list based on the device information to the client PC 107.

Registration of data that can be a processing target of the image processing apparatus and selection of the image processing apparatus from the client PC 107 to the print service server 103 are performed using a web browser of the client PC 107. Thus, registration of data that can be a processing target of the image processing apparatus and selection of the image processing apparatus can be performed from the portable terminal 102.

<<Registration Processing of Authentication Information from Portable Terminal 102 to Print Service Server 103>>

An authentication information registration request unit 331 of the portable terminal 102 accesses the print service and starts registration processing of authentication information. The authentication information is necessary for the print service server 103 to authenticate a user who is authenticated by the portable terminal 102 in response to successful biometric authentication performed in the portable terminal 102. The authentication information includes a public key, an authentication information ID, and the like, which is described in detail below. The authentication information flows on the network and thus does not include user specific biological information used for biometric authentication and a secret key to be generated in response to the biological information. The authentication information registration request unit 331 can be realized by JavaScript® when the print service is an application accessed by a web browser and the like or, when there is an application for the print service, can be realized in the application.

When the registration processing is started in response to an instruction from a user of the portable terminal 102, the print service of the print service server 103 requests an input of the legacy credential from the portable terminal 102. The user inputs the legacy credential for logging into the print service via a web browser and an application of the portable terminal 102. When the legacy credential is correctly input and successfully authenticated, registration processing of the authentication information different from the legacy credential can be performed on the print service server 103 with respect to the user.

A biological information input unit 332 of the portable terminal 102 receives an input of biological information, such as fingerprint information, from the user via the biological information sensor 248. A biological information management unit 333 associates the input biological information with a biological information ID for identifying the biological information and stores the associated information in the TPM 246. According to the present disclosure, the biological information management unit 333, an authentication request reception unit 334, and a biometric authentication unit 335 are installed as authentication modules for controlling the biometric authentication in the portable terminal 102 using hardware such as the biological information sensor 248 and the TPM 246. The authentication module is also referred to as an authenticator. The authentication information registration request unit 331 and other modules can be realized as a part of the authentication module.

After the biological information is input, the biometric authentication unit 335 generates a public key and secret key pair corresponding to the biological information. The biological information management unit 333 associates the generated secret key with the biological information ID for identifying the biological information corresponding to the secret key, the legacy credential, an ID indicating the print service server 103, and the like and stores and manages the associated information in the TPM 246. An example of the stored information stored is described with reference to Table B.

TABLE B

| Identification information ID | Service ID | Secret key | biological information ID |
|---|---|---|---|
| 407c-8841-79d | print.com | 1faea2da-a269-4fa7-812a-509470d9a0cb | d493a744 |
| . | . | . | |
| . | . | . | |
| . | . | . | |

An authentication information ID column in Table B stores identification information (ID) uniquely assigned to each registered information by the biological information management unit 333. A service ID column stores an ID that indicates a system (according to the present exemplary embodiment, the print service server 103) that the user cooperates with and is information of a top-level domain and a second-level domain. A secret key column stores a secret key. A biological information ID column stores an ID corresponding to feature amount information (biological information) that corresponds one-to-one with information, such as a fingerprint, input by a user.

The above-described public key is transmitted by the authentication information registration request unit 331 as the authentication information to the print service server 103 together with the authentication information ID managed in association therewith in Table B. An authentication information registration unit 314 of the print service server 103 stores the received authentication information in a storage device in association with the legacy credential. An example of information to be stored is described with reference to Table C.

TABLE C

| Authentication information ID | Public key | User ID |
|---|---|---|
| 407c-8841-79d | AC43C5FB-BFA2-48D1-A71B-FB04ACDA347A | user001 |
| 4c04-428b-a7a2 | 8142CA9F-35C9-4333-948F-BFCE66A74310 | user002 |
| . | . | . |
| . | . | . |

An authentication information ID column stores a value of the authentication information ID column in Table B. A public key column stores a public key to be a pair with the secret key in Table B. In other words, regarding a public key and a secret key that have the same authentication information ID in Table B, information encrypted by the secret key in Table B can be decrypted by the public key in Table C. The user ID is used and managed to associate with the legacy credential.

<<Request Processing and Output Processing in Image Processing Apparatus to Print Service Server 103>>

Processing will not be described that is performed to obtain a document instructed to be printed in advance from the client PC 107 to the print service server 103 by the image processing apparatus 101 from the print service server 103 in response to a user operating an arbitrary image processing apparatus 101 and outputting the document. The processing is described with reference to a sequence diagram in FIG. 4 in addition to FIG. 3.

In step S401, the image processing apparatus 101 accesses a uniform resource locator (URL) of the print service of the print service server 103 in response to an operation by a user. At this time, a document request unit 351 of the image processing apparatus 101 can issue a document request to a document request reception unit 315 of the print service server 103. Authentication of the user operating the image processing apparatus 101 is not yet performed with respect to the print service of the print service server 103.

Figure 5A:
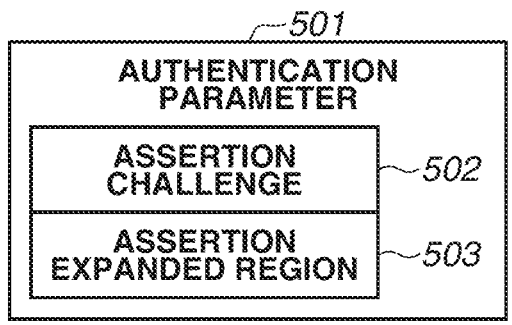
FIGS. 5A to 5D illustrate parameters for calling an authentication function according to the first exemplary embodiment.

In step S402, a user verification unit 316 generates an authentication parameter 501 illustrated in FIG. 5A in response to an access to the print service or receipt of the document request. In step S403, the document request reception unit 315 returns the authentication parameter 501 generated in step S402 as a response to the processing in step S401.

The authentication parameter 501 includes an assertion challenge 502 and an assertion expanded region 503. The assertion challenge 502 is verification data used for performing challenge response authentication. In the assertion expanded region 503, an expansion parameter is stored for the print service server 103 to control processing regarding the biometric authentication in the portable terminal 102.

In step S404, an authentication request unit 353 of the image processing apparatus 101 sends a biometric authentication request together with the authentication parameter 501 returned in step S403 to the authentication request reception unit 334 of the portable terminal 102 connected via the network 112 via NFC or Bluetooth®. A user can designate the portable terminal 102 to perform the biometric authentication with respect to the print service server 103 by operating the display device of the image processing apparatus 101. In this case, the image processing apparatus 101 transfers the authentication parameter to the portable terminal 102.

Figure 6:
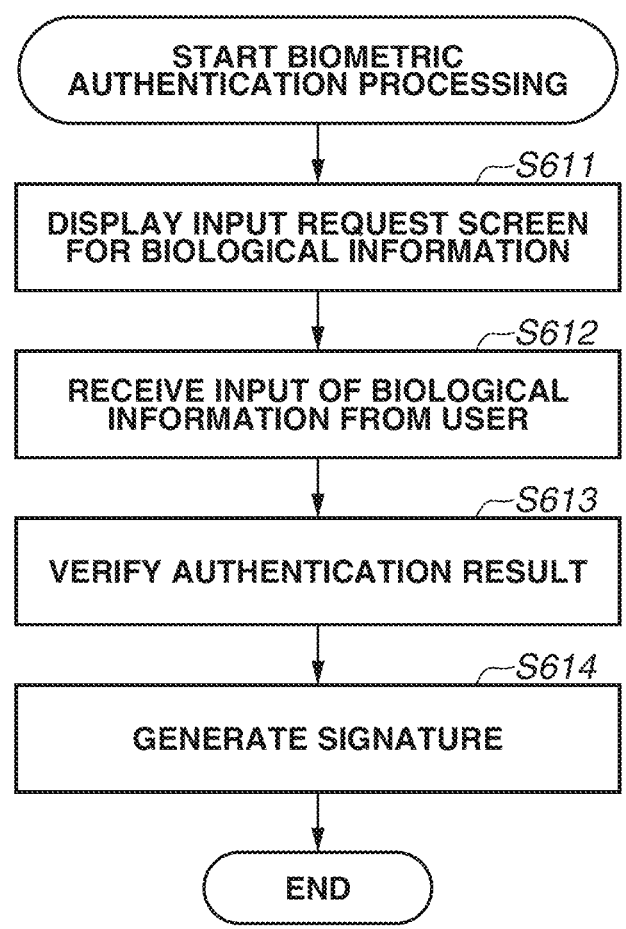
FIG. 6 is a flowchart regarding biometric authentication processing by a portable terminal according to the first exemplary embodiment.

In step S405, the biometric authentication unit 335 controls biometric authentication processing in response to receipt of the biometric authentication request. The biometric authentication processing is described in detail with reference to FIG. 6. A flowchart illustrated in FIG. 6 is used to describe processing realized by the CPU 242 of the portable terminal 102 executing a program.

Figure 9:
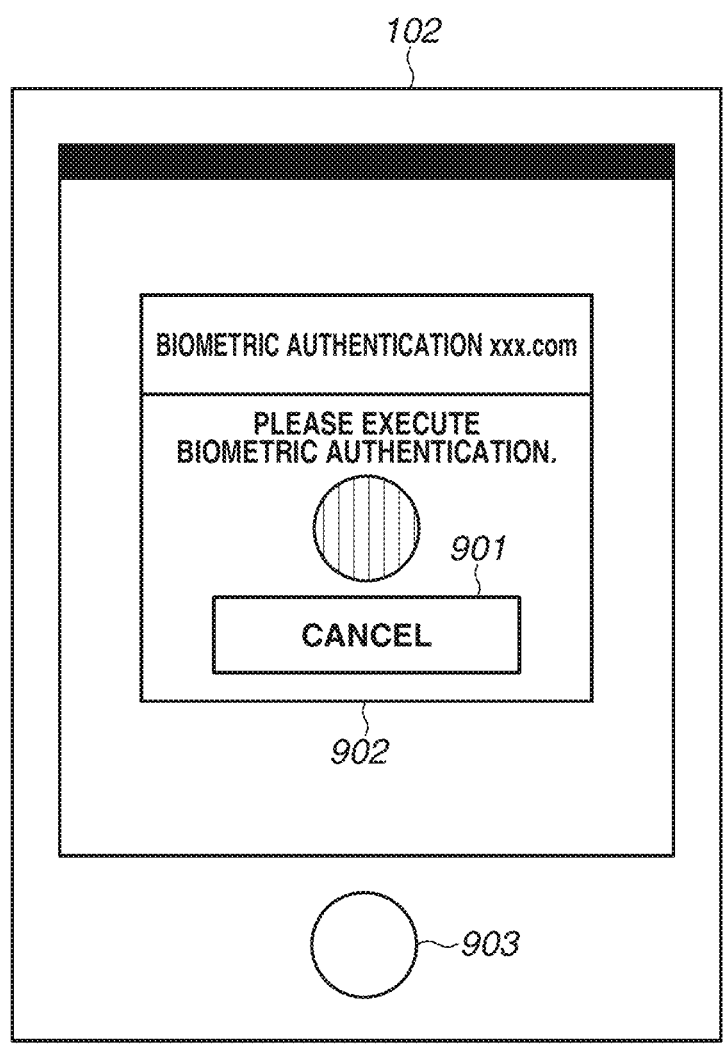
FIG. 9 illustrates an example of a request screen for biometric authentication displayed on a portable terminal.

In step S611, the biometric authentication unit 335 displays a request screen, as illustrated in FIG. 9, to prompt a user to input biological information for biometric authentication. According to the present exemplary embodiment, fingerprint information is handled as the biological information. However, other information such as an iris and a face can be used. In step S612, the biological information input unit 332 receives an input of the fingerprint information from the user via the biological information sensor 248 and obtains a feature amount of the fingerprint information. The feature amount is obtained by converting a feature unique to an individual, such as a fingerprint pattern, a pattern of an iris, or a shape of a vein, into a value that does not impair the uniqueness. In step S613, the biometric authentication unit 335 confirms a result of the authentication processing using the biological information received by the biological information sensor 248. When the biological information input by the user is already registered, and the authentication processing is successful, the processing proceeds to step S614.

Figure 5B:
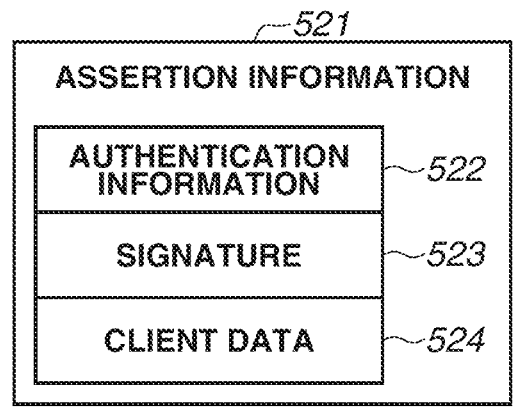

In step S614, the biometric authentication unit 335 obtains a secret key corresponding to the biological information authenticated in the authentication processing in step S613 by referring to Table B, executes encryption processing using the secret key, and thus generates signature data from the assertion challenge 502. The biometric authentication unit 335 generates assertion information 521 illustrated in FIG. 5B.

The assertion information 521 includes authentication information 522, a signature 523, and client data 524. With respect to the authentication information 522, the authentication information ID is set that is managed by Table B in association with the secret key used in step S614. With respect to the signature 523, the signature generated in step S614 is set. The client data 524 includes a configuration illustrated in FIG. 5C.

A configuration example of the client data 524 will be described. The client data 524 includes an assertion challenge 531, an expanded region 532, and a hash algorithm 533. The assertion challenge 531 is the same as the assertion challenge 502 transmitted from the print service server 103 in step S402. With respect to the expanded region 532, arbitrary information is set. The hash algorithm 533 is information expressing a hashing algorithm when the signature 523 is generated, and a character string such as S256 (=Secure Hash Algorithm (SHA)–256) and S384 (=SHA–384) is set thereto.

Figure 4:
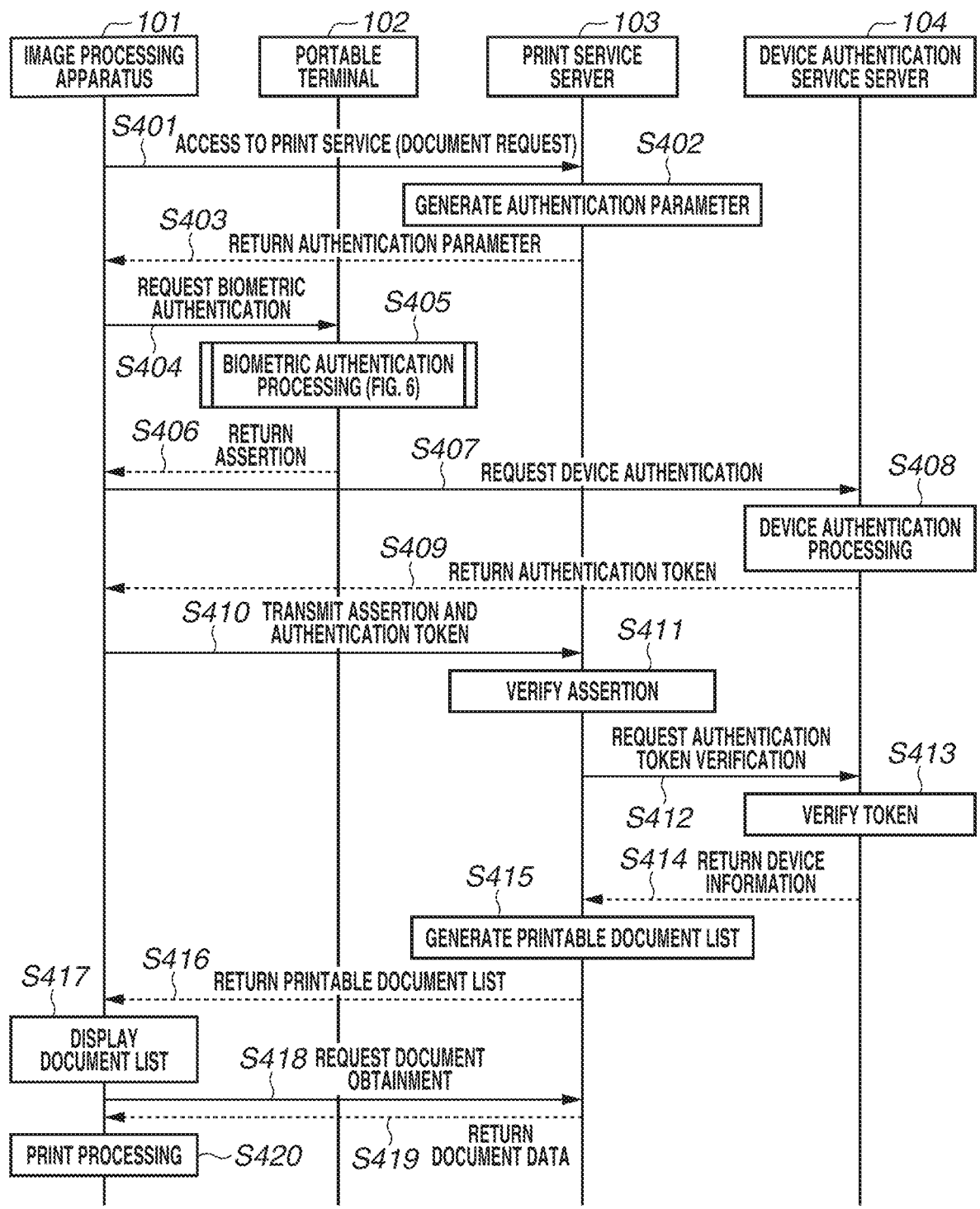
FIG. 4 illustrates an entire sequence diagram according to a first exemplary embodiment.

The description will now return to the description of the sequence in FIG. 4.

In step S406, the authentication request reception unit 334 returns the assertion information 521 generated by the processing illustrated in FIG. 6 to the image processing apparatus 101 as a response to the processing in step S404.

In step S407, a device authentication request unit 352 of the image processing apparatus 101 transmits a device authentication request to a device authentication request reception unit 371 of the device authentication service server 104. The image processing apparatus 101 also transmits the device ID that is identification information of the image processing apparatus and a password stored in a secure area in the image processing apparatus.

In step S408, a device authentication unit 373 verifies whether a combination of the device ID and the password transmitted in step S407 matches with a registered combination in response to receipt of the device authentication request and issues an authentication token when the combination has been registered. The issued authentication token is stored in the storage device in association with the device ID by a device authentication information management unit 375. In step S409, the device authentication request reception unit 371 returns the issued authentication token as a response to the processing in step S407.

In step S410, the document request unit 351 of the image processing apparatus 101 transmits the assertion information 521 and the authentication token to the document request reception unit 315 of the print service server 103. The document request unit 351 sets the authentication token to the expanded region 532 in the client data 524 included in the assertion information 521 as an example of a transmission method of the authentication token to the print service server 103 according to the present exemplary embodiment. Information is set to the expanded region 532 according to a JavaScript Object Notation (JSON) schema and the like as described by the following:

{'devicetoken': '00fde7ed-06bc-4d0f-8773-cb399e73eb6c'}

In step S411, the user verification unit 316 of the print service server 103 obtains public key information from Table C based on the authentication information ID included in the received assertion information 521 and verifies the signature 523 included in the assertion information 521 using the public key. The user verification unit 316 performs the verification by checking (determining matching of) data obtained by decrypting the signature 523 by the obtained public key against the assertion challenge 502 set in the authentication parameter in step S403. When the verification is correctly performed, the user who was biometrically authenticated in the portable terminal 102 is regarded as being successfully authenticated in the print service server 103 as the registered user, and the processing proceeds to step S412. When the verification of the assertion information fails in the user verification unit 316, the document request reception unit 315 responds to the image processing apparatus 101 as authentication failure (not illustrated).

In step S412, a device verification request unit 317 transmits a verification request of the authentication token including the authentication token received from the image processing apparatus 101 to a device verification request reception unit 372 of the device authentication service server 104.

In step S413, a device verification unit 374 determines whether the issued authentication tokens managed by the device authentication information management unit 375 include the one that matches the authentication token received via the device verification request reception unit 372. When a matched authentication token is the result of the determination, the verification is regarded as correctly performed, and in step S414, the device verification request reception unit 372 returns the device ID managed in association with the authentication token by the device authentication information management unit 375 together with the verification success to the print service server 103. When the results is not a matched authentication token, the device verification request reception unit 372 returns a notification of failure in the device verification to the print service server 103 (not illustrated). When the device verification fails, the print service server 103 can return a notification that there is no printable document to the image processing apparatus 101 as a response to the processing in step S410.

In step S415, the document request reception unit 315 specifies a user ID from Table C based on the authentication information ID included in the assertion information 521 that was successfully verified. In addition, the print data management unit 318 refers to Table A and extracts data of a document that is a document with the specified user ID and is printable by the device ID returned in step S414. The print data management unit 318 generates a document list including identification information (document ID) of a printable document based on the extracted data. The print data management unit 318 generates a blank document list when Table A does not include a record matching with the user ID and the device ID.

In step S416, the document request reception unit 315 returns the document list generated in step S415 to the document request unit 351 of the image processing apparatus 101. When there is a document associated with the user ID in Table A in step S415, but no document printable by the device ID obtained in step S413, information indicating this fact can be added to the response to be returned.

In step S417, a list display unit 354 displays the document list returned in step S416 on the display device of the image processing apparatus 101. A document selection unit 356 receives a selection by a user via the displayed list. Examples of display are described with reference to FIGS. 7A to 7C.

Figure 7A:
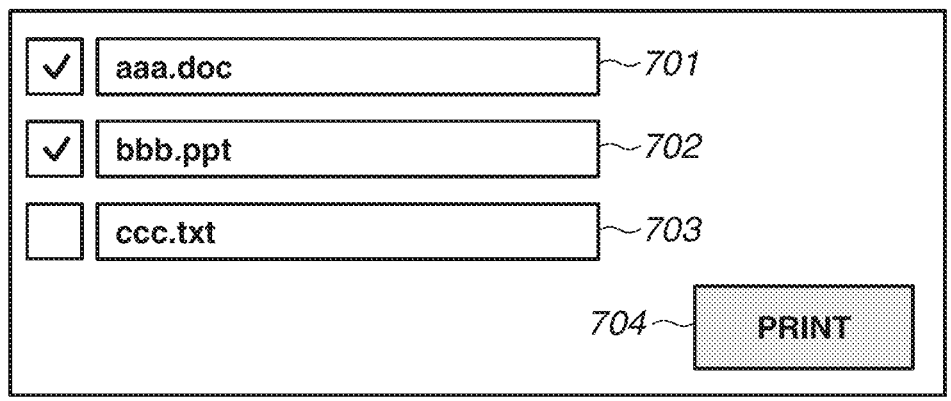
FIGS. 7A to 7C illustrate examples of screens displayed by an image processing apparatus according to the first exemplary embodiment.

In FIG. 7A, the returned document list (including documents 701, 702, and 703) is displayed on the display device of the image processing apparatus 101. The user biometrically authenticated in the portable terminal 102 selects a document to print from the list and presses a print button (704).

Figure 7B:
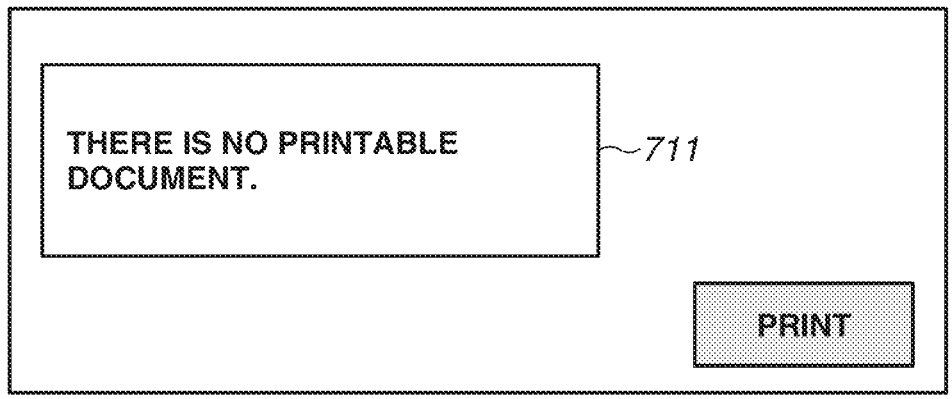
Figure 7C:
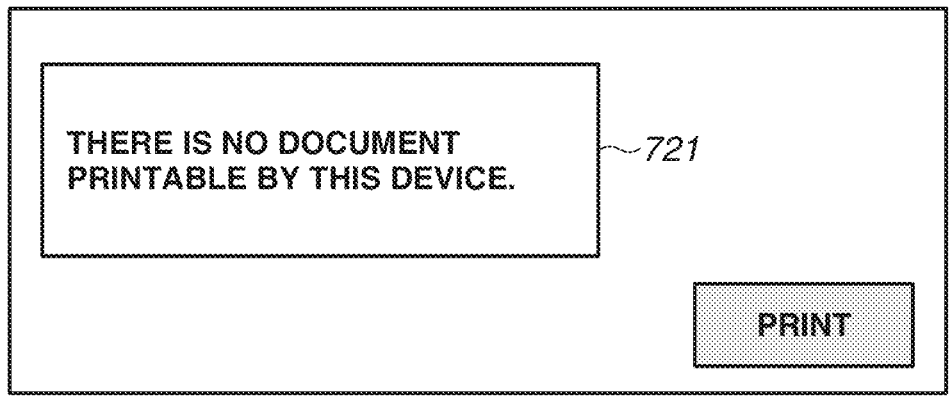

FIG. 7B illustrates an example of a screen that is displayed when there is no document associated with the user biometrically authenticated in the portable terminal 102 with respect to the response returned in step S416. FIG. 7C illustrates an example of a screen that is displayed when there is no document printable using the image processing apparatus 101 operated by the user biometrically authenticated in the portable terminal 102.

In step S418, the document request unit 351 transmits an obtainment request including the document ID corresponding to the selection by the user received via the document selection unit 356 to the print service server 103. In step S419, the document request reception unit 315 obtains data of the document from Table A based on the document ID designated in step S418 and returns the data of the document to the image processing apparatus 101. In step S420, the image processing apparatus 101 executes print processing of the data received in step S419.

It is assumed that the image processing apparatus 101 includes a biometric authentication sensor and a TPM, and information pieces indicated in Tables B and C are registered in advance between the image processing apparatus 101 and the print service server 103. In this case, the biometric authentication processing can be executed by the image processing apparatus 101 without using the portable terminal 102. In this case, the processing in steps S404 to S406 is omitted, and instead, the processing illustrated in FIG. 6 is executed by the image processing apparatus 101, and then the assertion information is generated.

As described above, the device control system in which the biometric authentication and the device authentication is combined can be realized according to the first exemplary embodiment.

A second exemplary embodiment will not be described. Differences between the second exemplary embodiment and the first exemplary embodiment will be described.

According to the first exemplary embodiment, when printing is instructed from the client PC 107, a device capable of printing is designated. However, for example, when a confidential document in, for example, a company is printed, only an image processing apparatus within the company can print the document to prevent the confidential document from becoming public. Even in such a case, it is highly inefficient from a usability standpoint to designate the image processing apparatus every time printing is performed. Thus, according to the present exemplary embodiment, a tenant management function of an image processing apparatus and a user is added, and the image processing apparatus belonging to the same tenant same as that of the user who issues a print instruction can perform printing.

The tenant management service server 105 illustrated in FIG. 3 is added for the present exemplary embodiment. The tenant management service server 105 manages information indicating which tenant a user and an image processing apparatus belong to.

An example of data stored in a tenant information management unit 382 of the tenant management service server 105 is described with reference to a table.

Table D is an example of a user management table for managing a relationship between a tenant and a user. A tenant ID column stores an ID for uniquely indicating an organization. A user ID column stores information corresponding to the user ID in the above-described legacy credential. Table D indicates that user 001 and user 002 belong to Tenant A, and user 003 belongs to Tenant B.

TABLE D

| User management table | |
|---|---|
| Tenant ID | User ID |
| Tenant A | user001 |
| Tenant A | user002 |
| Tenant B | user003 |
| ... | ... |

Table E is an example of a device management table for managing a relationship between a tenant and an image processing apparatus. Table E indicates that an image processing apparatus with a device ID "dev001" belongs to Tenant A, and image processing apparatuses with device IDs "dev002" and "dev003" belong to Tenant B.

TABLE E

Device management table

| Tenant ID | Device ID |
|---|---|
| Tenant A | dev001 |
| Tenant B | dev002 |
| Tenant B | dev003 |
| ... | ... |

When a user issues a print instruction using the client PC 107, the print instruction reception unit 311 receives the print instruction as described in the first exemplary embodiment. Subsequently, information of the tenant to which the user that issued the print instruction belongs and information of the image processing apparatus belonging to the same tenant are requested to a tenant information request reception unit 381 via a tenant information request unit 319. Based on the request received by the tenant information request reception unit 381, the tenant ID to which the instructed user belongs is obtained from the user management table (Table D) via a tenant information processing unit 383.

The device ID belonging to the obtained tenant ID is obtained from the device management table (Table E), and the information is returned to the tenant information request unit 319. The information is stored in the storage device by the print data management unit 318 similarly to the first exemplary embodiment.

According to the present exemplary embodiment, in the above-described step S415 in FIG. 4, the document request reception unit 315 specifies the user ID from Table C based on the authentication information ID included in the assertion information 521 that was successfully verified. In addition, the document request reception unit 315 checks whether the device ID returned in step S414 belongs to the tenant indicated by the tenant ID to which the specified user ID belongs. When the device ID is determined as the one belonging to the tenant, the document request reception unit 315 refers to Table A and extracts data of a document corresponding to the specified user ID. The print data management unit 318 generates a document list including identification information (document ID) of a printable document based on the extracted data.

According to the first and the second exemplary embodiments, an image processing apparatus is subjected to device authentication. However, there can be many instances where a device capable of printing is not designated depending on a user. In such an instance, making an authentication request to the device authentication service server 104 every time can increase a processing load on the image processing apparatus 101.

According to a first application, the image processing apparatus 101 makes a device authentication request to the device authentication service server 104 only when documents associated with a user who issues a print instruction include a document that designates a print device.

Figure 8:
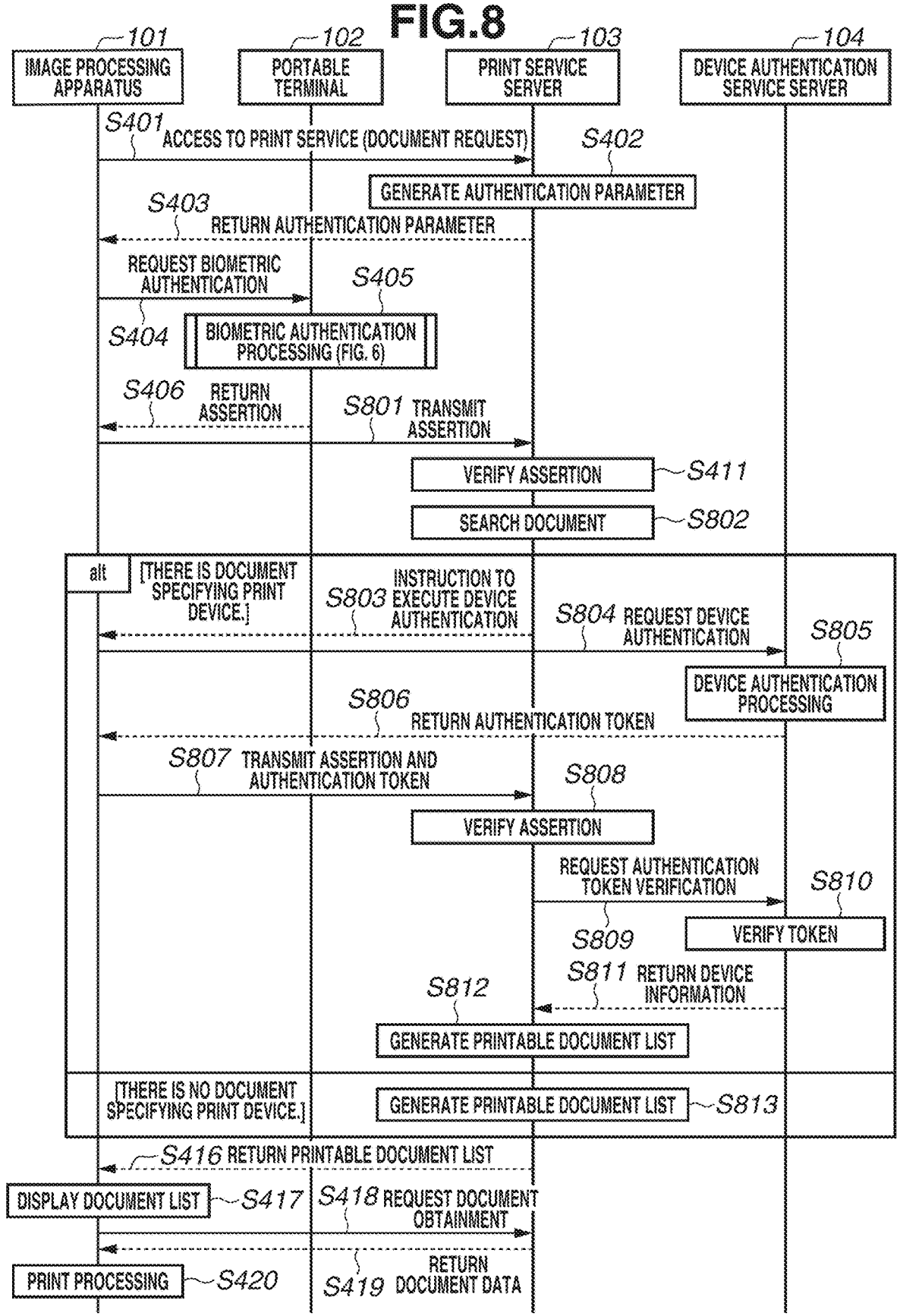
FIG. 8 is a flowchart regarding a first application.

FIG. 8 illustrates a sequence according to the present application. Processing similar to that illustrated in FIG. 4 is omitted from the following description.

Figure 5C:
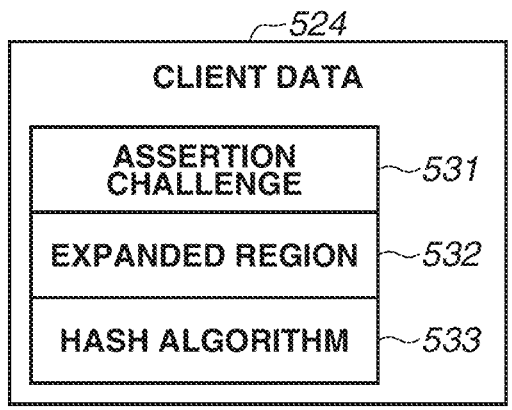
Figure 5D:
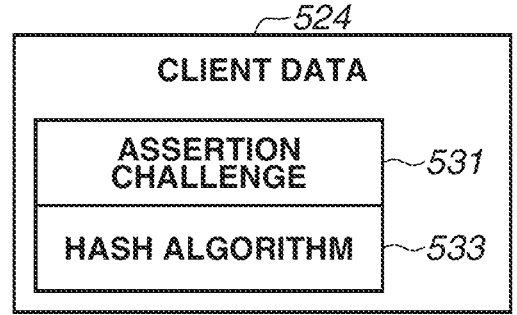

In step S801, the document request unit 351 of the image processing apparatus 101 transmits the assertion information obtained in the processing in step S406 to the print service server 103. According to the first exemplary embodiment, the authentication token obtained from the device authentication service server 104 is set to the expanded region 532 illustrated in FIG. 5C. According to the present application, the assertion information including the client data 524 in which data is not set in the expanded region as illustrated in FIG. 5D is transmitted to the print service server 103.

After the processing in step S411 in FIG. 4, in step S802, the document request reception unit 315 in the print service server 103 refers to Table A and searches the data of the document associated with the user ID that is specified as a result of the verification in step S411. When the data of the document that designates the device capable of printing exists in the data searched in Table A, processing in steps S803 to S812 is executed, and when there is no relevant data, processing in step S813 is executed.

In step S803, the document request reception unit 315 of the print service server 103 instructs the image processing apparatus 101 to perform device authentication as a response to the processing in step S801.

In step S804, the image processing apparatus 101 sends a device authentication request to the device authentication service server 104 in response to the instruction of the device authentication. The processing in steps S804 to S806 is similar to that described in steps S407 to S409 in FIG. 4, and as such, description of steps S804 to S806 is omitted herein.

In step S807, the image processing apparatus 101 adds the authentication token returned in step S806 to the assertion information data returned in step S406 and transmits them to the print service server 103. The client data included in the assertion information data transmitted in step S807 is the one in which the authentication token is set to the expanded region 532 illustrated in FIG. 5C.

The processing in steps S808 to S812 is similar to that described in steps S411 to S415 in FIG. 4, and as such, description of steps S808 to S812 is omitted herein.

In step S813, the document request reception unit 315 generates a document list using the data of the document associated with the user ID that is specified as a result of the verification in step S411 from Table A.

The processing in step S416 and subsequent steps is as described above with reference to FIG. 4, and thus the description thereof is omitted herein.

As described above, according to the first application, the image processing apparatus 101 sends the device authentication request to the device authentication service server 104 only when a print target document of the user who is biometrically authenticated requires the device authentication. Thus, a load on the present system can be reduced.

According to each of the above-described exemplary embodiments, strict device authentication is performed based on device registration using a device ID of the image processing apparatus and a password.

According to a second application, an example is described in which a device that can be used for output is limited depending on position information of an image processing apparatus. According to the second application, position information indicating an installation location of the image processing apparatus 101 or position information obtained by the portable terminal 102 that is connected to the image processing apparatus 101 for the biometric authentication is included in the assertion information and transmitted from the image processing apparatus 101 to the print service server 103. The print service server 103 specifies data of a document that a user who is biometrically authenticated in the portable terminal 102 can print by the image processing apparatus 101 based on the position information.

More specifically, when the assertion information is transmitted, the position information, as shown below, is set to the expanded region 532 in the client data 524 described with reference to FIG. 5C instead of the above-described authentication token. In the below example below, latitude information and longitude information are set in a geoinfo key:

```
{ 'geoinfo' : { 'Latitude' : 57.64911,   'Longitude' :
   10.40744 } }
```

In step S416, the print service server 103 includes only a document ID of a document printable by the image processing apparatus roughly specified by the position information in the document list.

According to the first and the second exemplary embodiments and the first and the second applications, the print service is described as an example. According to the present disclosure, a system can be similarly realized as a third application in which data selected from a list obtained from a service providing apparatus on the network is obtained in step S419, and an image processing apparatus performs a screen output and a print output of a three-dimensional shaped object instead of the above-described print processing.

In addition, according to the present disclosure, data (e.g., scan data and a captured image) input to an image processing apparatus can be output to a selected destination based on a selection by a user from a list of a storage service (e.g., a URL and a folder) obtained from a service providing apparatus on the network.

For example, the image processing apparatus 101 selects a storage service to which scanned data is stored from display on the display device of the image processing apparatus 101 at a timing of step S417. In this case, a scan service server (not illustrated) is installed as a service providing apparatus instead of the print service server 103. The list including a service that a user can use in selection of the storage service is provided from the storage service to the image processing apparatus 101. The storage service specifies the user ID by verifying the signature in the assertion information in a manner similar to the above-described exemplary embodiments. Examples of the storage service can include Evernote® and Dropbox®.

The scan service server verifies the assertion information in step S411 in FIG. 4 and, when specifying a user, generates a list of storage services to which cooperation is set in advance by the user. The storage service list generated here includes a URL of a login screen of the service and has a configuration as shown below:

```
{      'storagelist'      :      {      'evernote'      :
   'http://evernote.com/login'    },    {'dropbox'       :
   'http://dropbox.com/login' } }
```

The storage service list is returned in step S416 instead of the printable document list and displayed on the storage service in step S417. A user selects the service to which the scan data is stored from the displayed storage service list and performs a login process. Thus the scan service server executes storage of the scan data to the selected storage service.

OTHER EMBODIMENTS

The present disclosure includes an apparatus and a system configured by appropriately combining the above-described exemplary embodiments (the first and the second exemplary embodiments and the first to the third applications) and methods thereof.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-108255, filed May 31, 2017, which is hereby incorporated by reference herein in its entirety.

What is claimed is:

1. An image processing apparatus including a communication function that communicates with a portable terminal including an authentication module for biometric authentication and a storage region having tamper resistance, the storage region storing biological information of a user necessary for the authentication module to perform authentication processing and a secret key generated when the biological information is registered, the image processing apparatus comprising:
   a memory storing instructions; and
   a processor executing the instructions to cause the image processing apparatus to:
      transmit, in a case where verification data generated for using a service providing system is received via a network, the verification data to the portable terminal;
      receive signature data from the portable terminal in response to a success in authentication processing of the user by the authentication module included in the portable terminal, wherein the signature data is generated by the portable terminal using the secret key stored in the storage region and the verification data;
      transmit a request for device authentication to a device authentication system when the signature data has been received from the portable terminal based on the success in the authentication processing of the user;

receive an authentication token for the image processing apparatus from the device authentication system, wherein the authentication token is issued by the device authentication system to ensure a transmission source of the verification data authenticity of the image processing apparatus; and transmit the signature data and the authentication token to the transmission source via the network, wherein the device authentication system is different from the transmission source to which the image processing apparatus has transmitted the authentication token, and wherein, in a case where, at the transmission source, the signature data is verified by a public key corresponding to the secret key, and identification information of the image processing apparatus is obtained by requesting the device authentication system to verify the authentication token, the service providing system provides a service to the image processing apparatus.

2. The image processing apparatus according to claim 1, wherein the service providing system manages user identification information and device identification information as a service providing destination, and wherein in a case where the signature data is verified by the public key, and the identification information of the image processing apparatus is obtained from the device authentication system, the service providing system provides user identification information corresponding to a user biometrically authenticated in the portable terminal and a service managed in association with the identification information of the image processing apparatus obtained from the device authentication system to the image processing apparatus.

3. The image processing apparatus according to claim 1, wherein the signature data is transmitted from the image processing apparatus as assertion information via the network, and wherein the authentication token is set in an expanded region of the assertion information.

4. The image processing apparatus according to claim 1, wherein the request for device authentication is transmitted to the device authentication system in response to an instruction for device authentication from the service providing system.

5. The image processing apparatus according to claim 1, wherein, in a case where the portable terminal is designated to perform authentication processing according to an operation by the user on the image processing apparatus, the verification data is transmitted from the image processing apparatus to the portable terminal.

6. The image processing apparatus according to claim 1, wherein the service providing system provides data registered by the user in the service providing system as the service to the image processing apparatus, and wherein the image processing apparatus executes print processing using the provided data.

7. The image processing apparatus according to claim 1, wherein the service providing system provides data registered by the user in the service providing system as the service to the image processing apparatus, and wherein the image processing apparatus executes forming processing of a three-dimensional shaped object using the provided data.

8. The image processing apparatus according to claim 1, wherein the biological information is information related to one or more of a fingerprint, a vein, an iris, a voiceprint, and a face image of the user.

9. A method for an image processing apparatus including a communication function that communicates with a portable terminal including an authentication module for biometric authentication and a storage region having tamper resistance, the storage region storing biological information of a user necessary for the authentication module to perform authentication processing and a secret key generated when the biological information is registered, the method comprising:

transmitting, in a case where verification data generated for using a service providing system is received via a network, the verification data to the portable terminal;

receiving signature data from the portable terminal in response to a success in authentication processing of the user by the authentication module included in the portable terminal, wherein the signature data is generated by the portable terminal using the secret key stored in the storage region and the verification data;

transmitting a request for device authentication to a device authentication system when the signature data has been received from the portable terminal based on the success in the authentication processing of the user;

receiving an authentication token for the image processing apparatus from the device authentication system, wherein the authentication token is issued by the device authentication system to ensure a transmission source of the verification data authenticity of the image processing apparatus; and transmitting the signature data and the authentication token to the transmission source via the network, wherein the device authentication system is different from the transmission source to which the image processing apparatus has transmitted the authentication token, and wherein, in a case where, at the transmission source, the signature data is verified by a public key corresponding to the secret key, and identification information of the image processing apparatus is obtained by requesting the device authentication system to verify the authentication token, the service providing system provides a service to the image processing apparatus.

10. The method according to claim 9, wherein the signature data is transmitted from the image processing apparatus as assertion information via the network, and wherein the authentication token is set in an expanded region of the assertion information.

11. The method according to claim 9, wherein, in a case where the portable terminal is designated to perform authentication processing according to an operation by the user on the image processing apparatus, the verification data is transmitted from the image processing apparatus to the portable terminal.

12. A non-transitory computer readable storage medium that stores a computer program for making a computer execute a method for an image processing apparatus including a communication function which can communicate with a portable terminal comprising an authentication module for biometric authentication and a storage region having tamper resistance, the storage region storing biological information of a user necessary for the authentication module to perform authentication processing and a secret key generated when the biological information is registered, the method comprising:

transmitting, in a case where verification data generated for using a service providing system is received via a network, the verification data to the portable terminal;

receiving signature data from the portable terminal in response to a success in authentication processing of the user by the authentication module included in the portable terminal, wherein the signature data is generated by the portable terminal using the secret key stored in the storage region and the verification data;

transmitting a request for device authentication to a device authentication system when the signature data has been received from the portable terminal based on the success in the authentication processing of the user;

receiving an authentication token for the image processing apparatus from the device authentication system, wherein the authentication token is issued by the device authentication system to ensure a transmission source of the verification data authenticity of the image processing apparatus; and transmitting the signature data and the authentication token to the transmission source via the network, wherein the device authentication system is different from the transmission source to which the image processing apparatus has transmitted the authentication token, and wherein, in a case where, at the transmission source, the signature data is verified by a public key corresponding to the secret key, and identification information of the image processing apparatus is obtained by requesting the device authentication system to verify the authentication token, the service providing system provides a service to the image processing apparatus.

13. A system including:

a portable terminal including an authentication module for biometric authentication and a storage region having tamper resistance, the storage region storing biological information of a user necessary for the authentication module to perform authentication processing and a secret key generated when the biological information is registered, an image processing apparatus including a communication function that communicates with the portable terminal, a service providing system that provides a service to the image processing apparatus, and a device authentication system that issues an authentication token for the image processing apparatus, wherein the image processing apparatus comprises a first memory storing instructions and a first processor executing the instructions stored in the first memory to cause the image processing apparatus to transmit, in a case where verification data generated for using the service providing system is received via a network, the verification data to the portable terminal from the image processing apparatus;

wherein the portable terminal comprises a second memory storing instructions and a second processor executing the instructions stored in the second memory to cause the portable terminal to generate signature data using the stored secret key and the verification data in response to a success in authentication processing of the user by the authentication module;

wherein the instructions stored in the first memory to further cause the image processing apparatus to:

receive the generated signature data from the portable terminal;

transmit a request for device authentication to the device authentication system when the signature data has been received from the portable terminal based on the success in the authentication processing of the user;

receive the authentication token from the device authentication system, wherein the authentication token is issued by the device authentication system to ensure a transmission source of the verification data authenticity of the image processing apparatus; and transmit the signature data and the authentication token to the transmission source from the image processing apparatus via the network, wherein the device authentication system is different from the transmission source to which the image processing apparatus has transmitted the authentication token, and wherein, in a case where, at the transmission source, the signature data is verified by a public key corresponding to the secret key, and identification information of the image processing apparatus is obtained by requesting the device authentication system to verify the authentication token, the service providing system provides the service to the image processing apparatus.

14. The system according to claim 13, wherein the portable terminal generates the secret key and the public key in a case where biological information of the user is registered in the authentication module, and wherein the public key is transmitted from the portable terminal to the service providing system so as to be registered in association with user identification information of the user in the service providing system.

15. A method for a system including a portable terminal including an authentication module for biometric authentication and a storage region having tamper resistance, the storage region storing biological information of a user necessary for the authentication module to perform authentication processing and a secret key generated when the biological information is registered, an image processing apparatus including a communication function that communicates with the portable terminal, a service providing system that provides a service to the image processing apparatus, and a device authentication system that issues an authentication token for the image processing apparatus, the method comprising:

transmitting, in a case where verification data generated for using the service providing system is received via a network, the verification data to the portable terminal from the image processing apparatus;

generating signature data using the stored secret key and the verification data by the portable terminal in response to a success in authentication processing of the user by the authentication module;

receiving the generated signature data from the portable terminal by the image processing apparatus;

transmitting a request for device authentication to the device authentication system by the image processing apparatus when the signature data has been received from the portable terminal based on the success in the authentication processing of the user;

issuing the authentication token for the image processing apparatus by the device authentication system;

receiving the authentication token from the device authentication system by the image processing apparatus, wherein the authentication token is issued by the device authentication system to ensure a transmission source of the verification data authenticity of the image processing apparatus; and transmitting the signature data and the authentication token to the transmission source from the image processing apparatus via the network, wherein the device authentication system is different from the transmission source to which the image processing apparatus has transmitted the authentication token, and wherein, in a case where, at the transmission source, the signature data is verified by a public key corresponding to the secret key, and identification information of the image processing apparatus is obtained by requesting the device authentication system to verify the authentication token, the service providing system provides the service to the image processing apparatus.

\* \* \* \* \*